UNITED STATES PATENT OFFICE 2,616,901

CHLOROHYDRIN DERIVATIVES OF DIHYDROANTHRAQUINONE

Karl C. Whitehouse, Somerville, and Hans Z. Lecher, Plainfield, N. J., assignors to American Cyanamid Company, New York, N. Y., a corporation of Maine No Drawing. Application June 7, 1951, Serial No. 230,428

3 Claims. (Cl. 260—383)

This invention relates to the halohydrin addition products of 1,4-dihydroanthraquinone and their esters. The products may be represented by the following formula

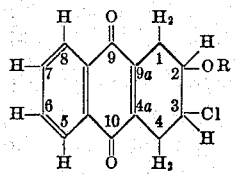

in which R is selected from the group consisting of hydrogen and a radical of a fatty acid having from two to twelve carbon atoms.

The compounds of the present invention are prepared by reacting 1,4-dihydroanthraquinone with chlorine or bromine and a hydroxyl compound such as water or a carboxylic acid. When water is used, R in the preceding formula is hydrogen, and when a carboxylic acid is used, R is the acyl radical of the acid.

1,4-dihydroanthraquinone contains two non-aromatic double bonds; one between carbons 2 and 3 and the other between carbons 4a and 9a. Ordinarily, where there are two or more olefinic double bonds, halogens and compounds such as hypohalous acid or acyl hypohalites add on to both double bonds. In the reaction of the present invention, however, the addition takes place only at the double bond between carbons 2 and 3. It is not known what the reason is for this anomalous behavior, and it is not intended to limit the invention to any theory of why the reaction takes place in this particular fashion, making it possible for the first time to produce pure compounds of the above formula.

The new compounds of the present invention are chemically well defined and stable and are useful intermediates for the production of various dyestuffs and other products.

The process by which the compounds of the present invention are made is simple and the reaction proceeds smoothly. No special technique need be learned to bring about the reaction in the present process. The exact mechanism of the addition to the double bond has been subject to considerable controversy in the case of olefinic compounds in the past. Formerly the reaction was formulated as an addition of hypohalous acid or acyl hypohalite. At the present time it is considered more probable that the nucleophilic olefin combines with a halogen cation, forming a carbonium ion which, in turn, combines with the hydroxy or carboxylic anion.

In the case of production of the halohydrin compound, it is advantageous to carry out the reaction in the presence of a water immiscible solvent which shows a preferential solvent action for hypochlorous acid and not for its anhydride. Typical examples are various ethers.

The invention will be further described in the following examples, the parts being by weight unless otherwise specified.

Example 1

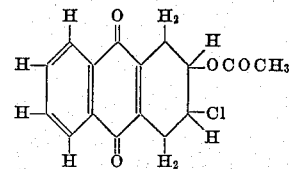

A slurry of 10.5 parts of 1,4-dihydroanthraquinone in 190 parts of acetic acid is treated at 20° C. with a stream of chlorine until an excess is present. The product separates and can be recrystallized from alcohol or acetone. It forms lemon yellow crystals.

Example 2

The procedure of Example 1 is followed, replacing the acetic acid with an equal amount of propionic acid. The product is obtained in the form of yellow crystals.

Example 3

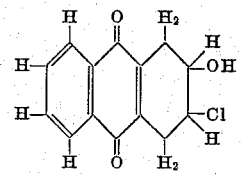

An aqueous solution of hypochlorous acid is prepared by passing chlorine into a solution of 12 parts of sodium bicarbonate in 150 parts of water, at a temperature of 0–5° C., until a precipitate no longer forms when a sample is heated with a solution of barium chloride. To this is added 70 parts of ether and 10.5 parts of 1,4-dihydroanthraquinone. The mixture is stirred overnight, gradually coming to room temperature. The solid product is separated by filtration, the ether being evaporated. The product is separated from unreacted starting material by extraction with alcohol, and is then isolated by evaporation. It may be recrystallized from toluene. The pale yellow crystals melt with decomposition.

Example 4

The procedure of Example 1 is followed, replacing 190 parts of acetic acid with 300 parts of butyric acid. The product obtained is in the form of yellow crystals.

Example 5

The procedure of Example 1 is followed, replacing 190 parts of acetic acid with 400 parts of lauric acid. The reaction, however, is carried out at a higher temperature, of approximately 50° C., in order to maintain the lauric acid in liquid form.

In the examples, the use of a number of typical fatty acids is described. In general, the process of the present invention includes the use of fatty acids having from two to twelve carbon atoms. Formic acid is not suitable because of excessive reactivity with halogen. Acids having more than twelve carbon atoms have melting points too high for best practical operation. Their reactivity also falls off.

We claim:

1. A compound of the formula

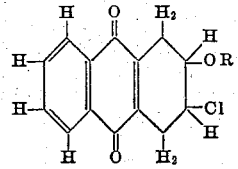

in which R is selected from the group consisting of hydrogen and a radical of a fatty acid having from two to twelve carbon atoms.

2. The compound of the formula

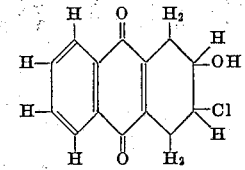

3. The compound of the formula

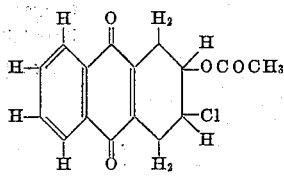

KARL C. WHITEHOUSE.
HANS Z. LECHER.

No references cited.